April 23, 1957 L. LEITZ ET AL 2,789,461
INVERTED MICROSCOPES FOR INCIDENT ILLUMINATION
Filed March 10, 1953 3 Sheets-Sheet 1
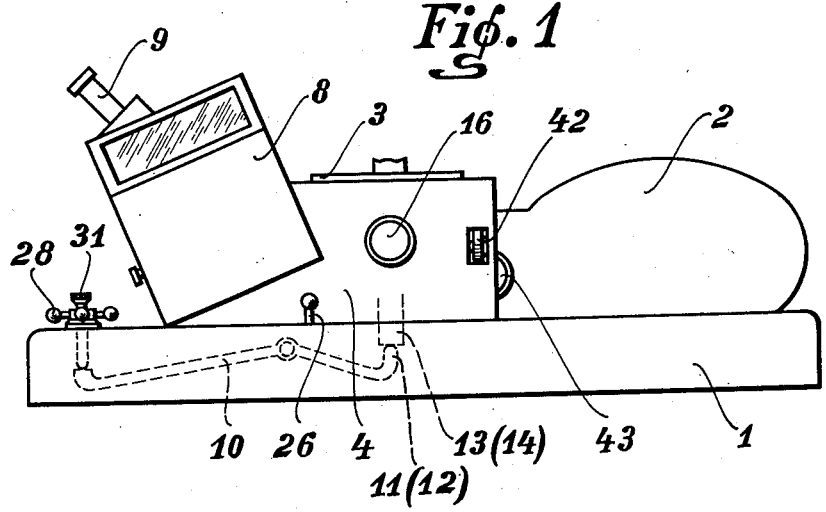
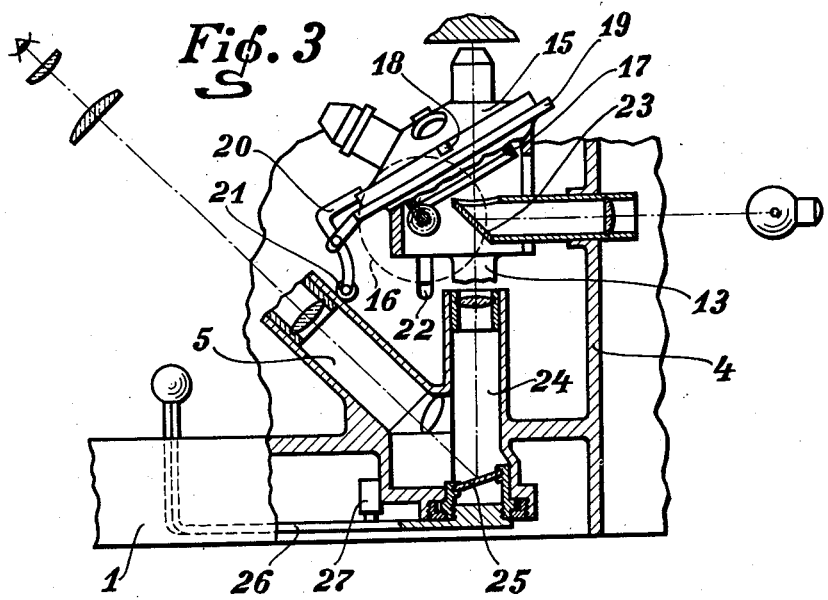
INVENTORS
Ludwig Leitz
Heinrich Klesmann
BY
Benj. T. Rauber
their attorney April 23, 1957 L. LEITZ ET AL 2,789,461
INVERTED MICROSCOPES FOR INCIDENT ILLUMINATION
Filed March 10, 1953 3 Sheets-Sheet 2
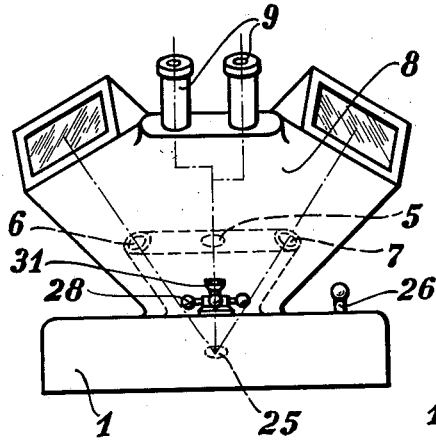
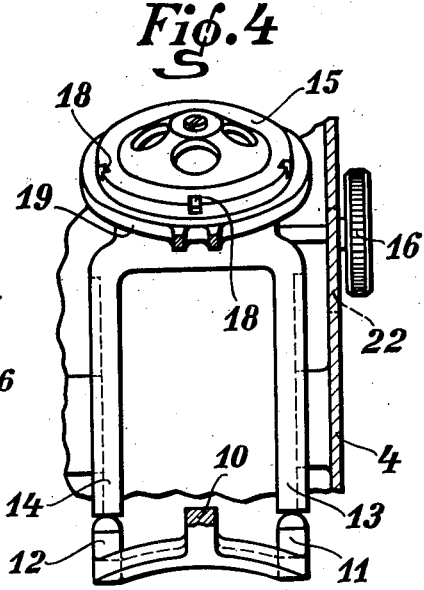
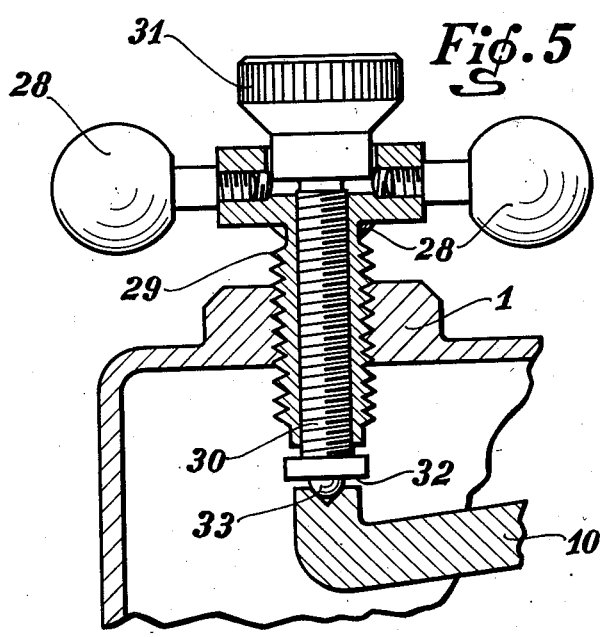
INVENTORS
Ludwig Leitz
Heinrich Klemann
BY
Benj. J. Rauber
their attorney

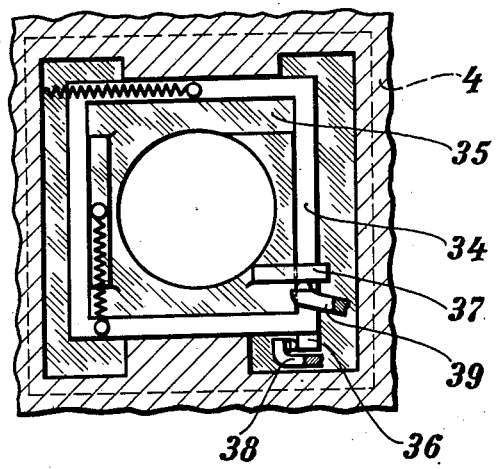
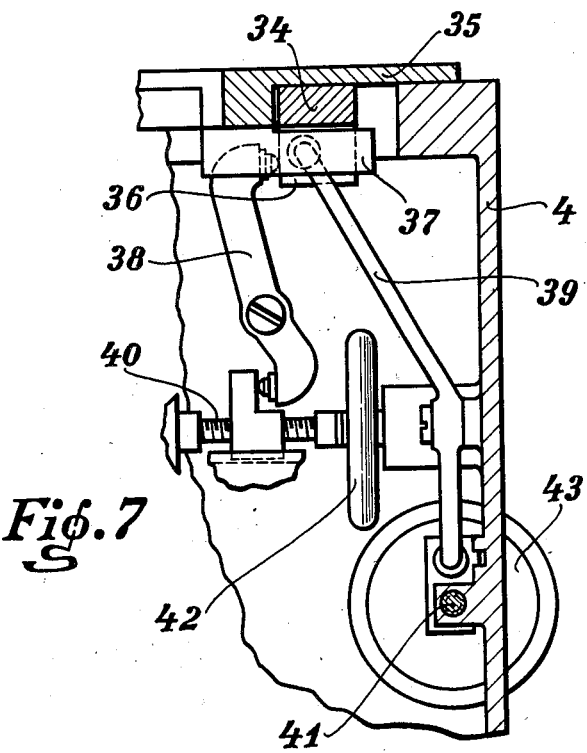

United States Patent Office 2,789,461
Patented Apr. 23, 1957

2,789,461

INVERTED MICROSCOPES FOR INCIDENT ILLUMINATION

Ludwig Leitz, Laufdorferweg, Wetzlar, and Heinrich Klemann, Burgsolms, Germany, assignors to Ernst Leitz, G. m. b. H., Wetzlar (Lahn), Germany, a corporation of Germany Application March 10, 1953, Serial No. 341,400

Claims priority, application Germany April 9, 1952

8 Claims. (Cl. 88—39)

Our invention relates to improvements in the inverted microscopes for incident illumination.

Inverted microscopes for incident illumination for metal and chemical research are known in which the objective tube is mounted beneath the object stage. Because of this, the eyepiece tube is inclined downwardly and receives the light rays from the objective tube by reflection from a mirror or a prismatic reflector. Microscopes of this type are also known in which the rays from the mirror are brought to a photographic camera whose optical axis is perpendicular to the axis of the eyepiece tube. This arrangement has the disadvantage that the user can not operate the camera and the eyepiece tube from one position.

The invention relates to an arrangement which avoids this disadvantage. It provides at both sides of the eyepiece tube a tube for any auxiliary apparatus such as a camera, a ground glass plate, photometer, etc. and a rotatable mirror beneath the objective tube in such manner as to reflect the light to any selected one of the other tubes.

More particularly, it provides a mounting for precise positioning of the objective and for lowering of the objective tube by a lever arm, for example a double arm lever. Two hand wheels actuating the lever are arranged co-axial and beneath the eyepiece so that they are conveniently accessible. In accordance with the invention a stop device may be provided for the objective revolving nose piece which permits a change of the objective only when the nose piece is lowered by the positioning device. Since the ends of the double arm lever describe arcs and the positioning device and objective tube move in straight lines, the lever ends are provided with sliding transmissions.

The problem of facilitating the operation of the microscope by the user from one and the same position requires moreover that the positioning of the co-ordinate stage be easily and conveniently reached from the same place. In accordance with the invention this is attained by arranging two hand wheels in such manner that their axes are perpendicular to each other and move the object stage on two co-ordinates by means of lever rods. The hand wheels are arranged at one corner of a housing. A part of the periphery of each hand wheel projects somewhat through one of the walls of the housing that meet in the corner of the housing so that both wheels can be operated by the fingers of one hand.

An embodiment of the invention is shown by way of example in the accompanying drawing, in which, Fig. 1 is a side elevation of a microscope embodying the invention, Fig. 2 is a front elevation of the microscope, Fig. 3 is a vertical section of a part of the microscope taken through the axes of the objective tube and observing tube, Fig. 4 is a front elevation of the positioning or setting device of the microscope, Fig. 5 is a section through the co-axial hand wheels, Fig. 6 is a plan of the object stage, and, Fig. 7 is a view of the adjusting device of the object stage.

On the base 1 of the microscope shown in the drawings are mounted the lamp housing 2, a middle housing 4 carrying the object stage 3, and the objective tube part 24 and three observation tubes 5, 6 and 7, which are enclosed in a common housing 8. A binocular tube 9 is provided for the middle observation tube 5. A double arm lever 10 is mounted in the base 1, one end of the lever being movable through a setting device which is located beneath the binocular eyepiece tube.

As shown particularly in Fig. 4, the other end of the double arm lever 10 is forked and the fork ends 11 and 12 support stationary supporting extensions 13 and 14 on which are mounted a revolving nose piece 15 carrying a number of objectives to be rotated selectively to position below the object stage 3. The nose piece 15 can be rotated by means of a control grip and worm 16 meshing with a ring gear 17, Fig. 3, and is provided with circumferentially spaced notches 18. As shown in Fig. 3, on the supporting part 19 of the revolving nose piece is provided a retaining pawl 20 provided with a roller 21 which rolls on the inclined observing tube 5. When the revolving nose piece is placed in raised position, the retaining pawl engages in one of the notches 18 so that the revolving nose piece is locked from rotation. In the wall of the housing 4 is a slit 22 through which the axle of the control grip 16 extends. Mounted within the lower part of the rotator supporting extensions 13 and 14 is a semi-transparent mirror 23 to reflect light from the lamp housing 2 to the object stage and through which light rays from the object pass downwardly.

Beneath the objective tube part 24 is a mirror 25 which can be turned on a vertical axis by a handle 26 so that the light can be directed to one of the three observation tubes. Correct positioning of the mirror in each of the positions is insured by a latch device 27.

The setting control hand wheels and screws which actuate the objective nose piece through the lever 10 are shown in Fig. 5 on an enlarged scale. Combined with the hand wheel 28 is a steep pitch screw 29 internally threaded with a smaller or finer pitch to receive a less steeply pitched screw 30 which at its upper end is fitted with a fine adjustment knob 31 and with a plane surface at its lower end 32. Between this plane surfaced lower end and the lever end is a hemisphere 33 which slides on the plane surface in order to transform the arcuate movement of the lever end to a straight line movement of the screw 3.

The object stage 3, Fig. 6, is embodied as one movable crosswise and endwise and comprises two plates 34 and 35 movable at right angles to each other. Projections 36 and 37 of these plates, respectively, are engaged by levers 38 and 39, respectively, which are actuated from hand wheels 42 and 43, Figs. 1 and 7, respectively, through screws 40 and 41. The hand wheels are positioned at right angles to each other and extend partly through two adjacent walls of a corner of the housing, Fig. 1. This arrangement permits both wheels to be operated by the fingers of one hand.

What we claim is:

1. An inverted type microscope for incident illumination comprising a base having a housing thereon and an object stage carried on said housing, an objective beneath said object stage, an objective tube mounted on said base beneath said objective, an upwardly inclined observation tube and an upwardly inclined tube at each side of said observation tube and immediately adjacent thereto, said inclined tubes being at the front end of said housing, the optical axes of said upwardly inclined tubes converging and intersecting the optical axis of said objective tube at a common point, a mirror having its reflecting surface at the intersection of said optical axes and inclined to reflect light from said objective tube to a selected one of said inclined tubes, a mounting for said mirror rotatable on the axis of said vertical tube to a position to reflect light from said objective tube to a selected one of said inclined tubes, manual means operable from the front of said base to rotate said mirror, a vertically movable objective carrying element having means manually operable from a position at the front of said base to raise and lower said element, a nose having objectives mounted thereon to be brought selectively into position upon rotation of said nose in lowered position and locked from rotation in raised position.

2. The microscope of claim 1 in which said manually operable means to raise and lower said objective carrying element comprises a lever in said base and a manually operative screw element in the front portion of said base engaging said lever to tilt it to raised or lowered position.

3. The microscope of claim 2 in which said manually operative screw element includes a pair of screws of different pitch for coarse and fine adjustment.

4. The microscope of claim 2 having a sliding connection between said adjusting screws and said lever.

5. The microscope of claim 2 in which said object stage is movable in co-ordinate directions and which comprises manually operable means for moving said stage in each of said co-ordinate directions in position to be operated by an observer while viewing through said viewing tube.

6. The microscope of claim 5 in which said manually operable means for moving said stage comprises a pair of levers, one to move said table in one direction and the other to move it in a direction at right angles thereto and a pair of operating hand wheels to actuate said levers, the axes of said hand wheels being perpendicular to each other, the periphery of one hand wheel projecting through a housing wall at one corner thereof and the periphery of the other hand wheel projecting through the adjacent wall of said corner.

7. The microscope of claim 1 in which said objective tube is vertical.

8. An inverted type microscope for incident illumination comprising a base having a housing thereon, an object stage carried on said housing, means comprising a pair of knobs positioned to be operated simultaneously by the fingers of one hand to shift said stage respectively in co-ordinate directions, a vertically movable support beneath said object stage, manually operable means to raise and lower said support, an objective nose carrying objectives and rotatably mounted for manual rotation on said support to bring an objective into position beneath said object stage, means operable outside said housing to rotate said nose, a latch to lock said nose in operative position and engaging a fixed part of the microscope to tilt out of locking position when said support and nose are lowered, a semi-reflecting mirror mounted in inclined position beneath the objective to reflect light through said objective to the object stage, a vertical objective tube below said mirror co-axial with said objective, light receiving tubes in side by side position at the front of said housing one of said tubes being an observation tube, and inclined downwardly with their optical axes intersecting the optical axis of said objective tube at a common point and a second mirror at the lower part of said objective tube having its reflecting surface at said point of intersection of said optical axes and inclined to reflect light from the object tube to said inclined tubes and rotatable on the optical axis of said objective tube to reflect light to a selected one of said inclined tubes, said pair of knobs, manual support lifting and lowering means, nose rotating means and means to rotate said mirror being within reach of an operator viewing through said viewing tube.

References Cited in the file of this patent
UNITED STATES PATENTS

| | | |
|---|---|---|
| 373,634 | Bausch | Nov. 22, 1887 |
| 1,894,264 | Chretien | Jan. 17, 1933 |
| 2,003,387 | Ott | June 4, 1935 |
| 2,502,788 | Hunter | Apr. 4, 1950 |
| 2,518,240 | Lowber et al. | Aug. 8, 1950 |
| 2,518,252 | Reardon et al. | Aug. 8, 1950 |
| 2,614,454 | Steffen | Oct. 21, 1952 |
| 2,645,972 | Aitcheson | July 21, 1953 |
| 2,651,969 | Thor | Sept. 15, 1953 |

FOREIGN PATENTS

| | | |
|---|---|---|
| 2,486 | Great Britain | of 1870 |
| 233,410 | Great Britain | May 6, 1925 |
| 516,926 | Germany | Feb. 12, 1931 |
| 539,528 | Germany | Dec. 4, 1931 |
| 140,676 | Austria | Feb. 25, 1935 |
| 800,441 | Germany | July 8, 1949 |
| 648,292 | Great Britain | Jan. 3, 1951 |

OTHER REFERENCES

Review d'Optique, periodical, France, vol. 30, No. 11, 1951, pages 473–475, Felicien Blottiau.